(12) United States Patent
Choi et al.

(10) Patent No.: US 11,389,883 B2
(45) Date of Patent: Jul. 19, 2022

(54) CUTTING INSERT AND CUTTING TOOL HAVING SAME MOUNTED THEREIN

(71) Applicant: KORLOY INC., Seoul (KR)

(72) Inventors: Young Nam Choi, Cheongju-si (KR); Sang Yong Lee, Cheongju-si (KR); Young Heum Kim, Cheongju-si (KR); Sun Yong Ahn, Cheongju-si (KR)

(73) Assignee: KORLOY INC., Seoul (KR)

( * ) Notice: Subject to any disclaimer, the term of this patent is extended or adjusted under 35 U.S.C. 154(b) by 161 days.

(21) Appl. No.: 16/757,994

(22) PCT Filed: Aug. 31, 2018

(86) PCT No.: PCT/KR2018/010107
§ 371 (c)(1),
(2) Date: Apr. 21, 2020

(87) PCT Pub. No.: WO2019/098508
PCT Pub. Date: May 23, 2019

(65) Prior Publication Data
US 2020/0338652 A1    Oct. 29, 2020

(30) Foreign Application Priority Data
Nov. 14, 2017 (KR) .......... 10-2017-0151632

(51) Int. Cl.
 B23C 5/20 (2006.01)
 B23B 27/16 (2006.01)
 B23B 27/22 (2006.01)

(52) U.S. Cl.
CPC .......... *B23C 5/202* (2013.01); *B23C 5/205* (2013.01); *B23C 2200/203* (2013.01);
(Continued)

(58) Field of Classification Search
CPC .......... B23C 2200/28; B23C 2210/168; B23C 2210/50; B23C 5/109; B23C 5/20;
(Continued)

(56) References Cited

U.S. PATENT DOCUMENTS 4,648,760 A * 3/1987 Karlsson ................. B23B 51/00
407/113
5,454,671 A * 10/1995 Qvarth .................... B23C 5/202
407/42

(Continued)

FOREIGN PATENT DOCUMENTS

JP      2012081526 A  *  4/2012  ............. B23C 5/109
JP      2017-113830 A     6/2017
(Continued)

*Primary Examiner* — Sara Addisu
(74) *Attorney, Agent, or Firm* — Rabin & Berdo, P.C.

(57) ABSTRACT

The present disclosure relates to a cutting insert, and a cutting insert according to the present disclosure comprises: an upper surface and a lower surface oriented in opposite directions; a first and a second shorter side surface connecting the upper surface and the lower surface to each other and oriented in opposite directions; a first and a second longer side surfaces connecting the upper surface and the lower surface to each other, connecting the first and the second shorter side surfaces to each other, oriented in opposite directions, and being longer than the first and the second shorter side surfaces; and a through hole extending through the upper surface and the lower surface, wherein when viewed toward the upper surface, the first longer side surface has two side portions, each side portion having an inclined shape with reference to the center portion.

14 Claims, 11 Drawing Sheets

(52) U.S. Cl.
CPC .... *B23C 2200/28* (2013.01); *B23C 2210/168* (2013.01); *B23C 2210/50* (2013.01)

(58) Field of Classification Search
CPC ... B23C 5/205; B23C 2200/203; B23C 5/207; B23C 5/2213; B23C 2200/201; B23C 2200/0494; B23C 2200/123; B23C 5/02
See application file for complete search history.

(56) References Cited

U.S. PATENT DOCUMENTS

| | | | | |
|---|---|---|---|---|
| 5,622,461 | A * | 4/1997 | Tukala | B23C 5/207 408/233 |
| 5,709,509 | A * | 1/1998 | Wegener | B23C 5/2213 407/115 |
| 5,758,994 | A * | 6/1998 | Hintze | B23B 27/141 407/115 |
| 7,040,844 | B1 * | 5/2006 | Daiguji | B23C 5/109 407/113 |
| 7,367,755 | B2 * | 5/2008 | Wurfels | B23B 27/1618 407/115 |
| 9,272,335 | B2 * | 3/2016 | Ramesh | B23B 51/00 |
| 2001/0033779 | A1 * | 10/2001 | Wiman | B23B 27/141 408/188 |
| 2011/0255924 | A1 * | 10/2011 | Choi | B23C 5/202 407/42 |
| 2012/0009029 | A1 * | 1/2012 | Saji | B23C 5/207 407/103 |
| 2015/0139743 | A1 * | 5/2015 | Ballas | B23C 5/207 407/113 |
| 2016/0158854 | A1 * | 6/2016 | Ishi | B23C 5/207 409/131 |
| 2016/0288223 | A1 * | 10/2016 | Ishi | B23C 5/207 |
| 2017/0225244 | A1 * | 8/2017 | Crespin | B23C 5/207 |
| 2017/0326656 | A1 * | 11/2017 | Saji | B23C 5/109 |
| 2018/0036811 | A1 * | 2/2018 | Saji | B23C 5/207 |
| 2019/0047059 | A1 * | 2/2019 | Shiroma | B23C 5/207 |
| 2019/0084060 | A1 * | 3/2019 | Yamamichi | B23C 5/06 |
| 2019/0160562 | A1 * | 5/2019 | Men | B23C 5/2221 |
| 2021/0331258 | A1 * | 10/2021 | Muthuswamy | B23C 5/207 |

FOREIGN PATENT DOCUMENTS

| | | |
|---|---|---|
| KR | 10-0260277 B1 | 8/2000 |
| KR | 10-2009-0108905 A | 10/2009 |
| KR | 100958403 B1 | 5/2010 |
| KR | 10-2016-0100404 A | 8/2016 |
| WO | 9317822 A1 | 9/1993 |
| WO | 2016203843 A1 | 12/2016 |

* cited by examiner (a)

(b)

CUTTING INSERT AND CUTTING TOOL HAVING SAME MOUNTED THEREIN

TECHNICAL FIELD

The present disclosure relates to a cutting insert and a cutting tool having the same mounted therein.

BACKGROUND ART

Generally, a cutting insert is fastened to a cutting tool mounted on a machine tool and is used for cutting a workpiece made of iron, non-ferrous metal, non-metal material, and so on.

Such a cutting insert has a shape such that the sides connecting the upper surface and the lower surface are rotationally symmetrical with respect to each other by 180 degrees with respect to the center thereof, and thus are broadly divided into a double-sided cutting insert that can use both upper and lower surface-side cutting edges, and a single-sided cutting insert that uses only the upper surface-side cutting edge.

As the related art, the replaceable cutting insert is disclosed in the Korean Patent Laid-Open No. 10-2009-0108905, which includes, as shown in FIG. 14, an upper surface 150 and a lower surface 160 facing each other, two longitudinal side surfaces 110 and 120 and two transverse side surfaces 130 and 140 connecting the upper surface 150 and the lower surface 160, and a through hole 190 extending through the respective centers of the upper surface 150 and the lower surface 160. For reference, the same reference numerals are used in the background art as they are used in the Korean Patent Laid-Open No. 10-2009-0108905, but the same reference numerals do not necessarily refer to the same components even if they overlap with the reference numerals used in the detailed description of the present disclosure to be described below.

However, according to the related technique described above, since each of the two longitudinal side surfaces 110 and 120 is formed as a flat surface as a whole, there is a problem that the fastening force with a seat surface is decreased due to impacts applied during cutting, which allows movements on the seat surface of the cutter 200 of the milling apparatus, or the like. In particular, during high-speed machining, the distribution force is large and vibration easily occurs, resulting in a problem that the fastening force with the seat surface is further reduced.

SUMMARY

Technical Problem

A technical object of the present disclosure is to provide a cutting insert capable of improving a fastening force with a seat surface, and a cutting tool having the same mounted therein.

Another technical object of the present disclosure is to provide a cutting insert capable of improving rigidity as well as fastening force, and a cutting tool having the same mounted therein.

Still another technical object of the present disclosure is to provide a cutting insert capable of improving cutting characteristics as well as fastening force, and a cutting tool having the same mounted therein.

Technical Solution

In order to achieve the above objects, a cutting insert according to an embodiment of the present disclosure is provided, which may include an upper surface and a lower surface oriented in opposite directions, a first and a second shorter side surface connecting the upper surface and the lower surface to each other and oriented in opposite directions, a first and a second longer side surfaces connecting the upper surface and the lower surface to each other, connecting the first and the second shorter side surfaces to each other, oriented in opposite directions, and being longer than the first and the second shorter side surfaces, a through hole extending through the upper surface and the lower surface, a shorter cutting edge provided at a boundary between the upper surface and the first shorter side surface, a first corner cutting edge provided at a boundary between the upper surface and a corner between the first longer side surface and the first shorter side surface, and a second corner cutting edge provided at a boundary between the upper surface and a corner between the second longer side surface and the first shorter side surface, in which, when viewed toward the upper surface, the first longer side surface may have two side portions, each side portion having an inclined shape with reference to the center portion.

In one example, when viewed toward the upper surface, first longer side surface may have a shape such that the center portion thereof is convexly protruded.

When viewed toward the upper surface, the first longer side surface may include a convex portion which is convexly protruded and which forms a center portion, first and second inclined sections forming both sides with reference to the convex portion and gradually inclined toward an inside of the upper surface as further away from the convex portion, and first and second concave portions which are concavely recessed and which form end portions of the first and second inclined sections.

When viewed in a section cut along a vertical direction from the upper surface to the lower surface, the first longer side surface may form a vertical angle with the upper surface.

When viewed toward the upper surface, the first shorter side surface may have an outwardly convex shape, and one side with reference to a center portion of the first shorter side surface may form an acute angle with one of the inclined sides of the first longer side surface.

When viewed toward the upper surface, the first shorter side surface may have a curved shape as a whole or a shape that combines a curved line and a straight line.

When viewed toward the first shorter side surface, the shorter cutting edge may have a curved shape as a whole or a shape that combines a curved line and a straight line.

In one example, when viewed toward the first shorter side surface, the first corner cutting edge may be positioned higher than the second corner cutting edge, and the highest portion of the shorter cutting edge may be positioned closer to the first corner cutting edge than the second corner cutting edge.

In another example, when viewed toward the first shorter side surface, the first corner cutting edge may be positioned lower than the second corner cutting edge, and the highest portion of the shorter cutting edge may be positioned closer to the second corner cutting edge than the first corner cutting edge.

In still another example, when viewed toward the first shorter side surface, the first and second corner cutting edges may be positioned at the same height, and the highest portion of the shorter cutting edges may be positioned closer to the center than the first and second corner cutting edges.

When viewed toward the first longer side surface, the first shorter side surface may form a vertical angle with the upper surface.

When viewed toward the upper surface, the shorter cutting edge may have a curved shape that is outwardly convex.

In another example, when viewed toward the upper surface, the first longer side surface may have a shape such that a center portion thereof is concavely recessed.

When viewed toward the upper surface, the first longer side surface may include a concave portion which is concavely recessed and which forms a center portion, and first and second inclined sections forming both sides with reference to the concave portion and being gradually inclined as further away from the concave portion outward the upper surface.

When viewed toward the upper surface, each of the first and second inclined sections may have a straight shape.

In one example, the upper surface may be rotationally symmetrical by 180 degrees with respect to a center thereof.

In another example, the upper surface and the lower surface may have the same shape as each other, each of the upper and lower surfaces may be rotationally symmetrical by 180 degrees with respect to a center thereof, each of the first and second shorter side surfaces may be rotationally symmetrical by 180 degrees with respect to a center thereof, and each of the first and second longer side surfaces may be rotationally symmetrical by 180 degrees with respect to a center thereof.

Meanwhile, a cutting tool according to an embodiment of the present disclosure is a cutting tool having, mounted therein, the cutting insert according to the embodiments of the present disclosure described above, which may include a first seat surface on which the lower surface is placed, a second seat surface on which the first longer side surface is placed, and a third seat surface on which the first shorter side surface is placed, in which the second seat surface may have a first longer side inclined surface and a second longer side inclined surface on which the inclined both sides of the first longer side surface may be respectively seated.

The third seat surface may include a shorter side inclined fastening surface on which the one side of the first shorter side surface is seated and which is adjacent to an outer circumferential surface of the cutting tool, and the shorter side inclined fastening surface may form an acute angle with any one of the first longer side inclined fastening surface and the second longer side inclined fastening surface.

Advantageous Effects

A cutting insert according to the present disclosure having the configuration as described above and a cutting tool having the same mounted therein may have the following effects.

The technical configuration of the cutting insert according to the present disclosure includes an upper surface, a lower surface, first and second shorter side surfaces, first and second longer side surfaces, and a through hole extending through the upper and lower surfaces, in which, when viewed through the upper surface, the first longer side has a shape such that both sides thereof are inclined with reference to a center portion thereof, so that the inclined both sides are in close contact with the sheet surface of the cutting tool, and accordingly, the fastening force with the sheet surface of the cutting tool can be improved during cutting.

In addition, the cutting insert according to the present disclosure has a shape such that, when viewed toward the upper surface, a center portion of the first longer side surface is convexly protruded, so that the through hole and the cutting tool fastening bolt inserted therein can be formed with a relatively large diameter, and accordingly, the fastening force with the cutting tool can be further improved.

In addition, according to the technical configuration of the cutting insert according to the present disclosure, when viewed toward the upper surface, the first longer side surface has an outwardly convex shape and one side thereof with reference to the center portion of the first longer side surface forms an acute angle with one of the inclined both sides of the longer side surface, and accordingly, the fastening force with the cutting tool can be further improved.

In addition, according to the cutting insert of the present disclosure, when viewed toward the first longer side surface, the first longer side surface forms a vertical angle (so-called negative type) with the upper surface so that, as compared with when the acute angle (so-called positive) is formed therebetween, the rigidity of the shorter cutting edge provided at the boundary between the upper face and the first longer side surface can be increased.

In addition, according to the cutting insert of the present disclosure, when viewed toward the upper surface, the first longer side surface has a shape such that a center portion thereof is concavely recessed so that the sheet surface of the cutting tool can be protruded as much as the concave recess, that is, the web size of the cutting tool can be increased, and accordingly, the rigidity of a holder of the cutting tool can be improved.

Further, according to the technical configuration of the cutting insert of the present disclosure, when viewed toward the first longer side surface, the shorter cutting edge has a curved shape or a shape that combines a curved line and a straight line, and also a curved shape that is outwardly convex when viewed toward the upper surface, so that the shorter cutting edge has an approximately helix edge structure, and accordingly, the cutting characteristics for the shorter cutting edge can be improved, and the cutting load on the shorter cutting edge can be reduced.

Meanwhile, the present disclosure may have other effects that can be derived from the configuration according to the present disclosure in addition to the effects described above.

BEST MODE

Hereinafter, preferred embodiments of the present disclosure will be described in detail with reference to the accompanying drawings, which will be readily apparent to those skilled in the art to which the present disclosure pertains. However, the description proposed herein is just a preferable example for the purpose of illustrations only, and not intended to limit the scope of the disclosure, so it should be understood that other equivalents and modifications could be made thereto without departing from the scope of the disclosure.

Figure 1:
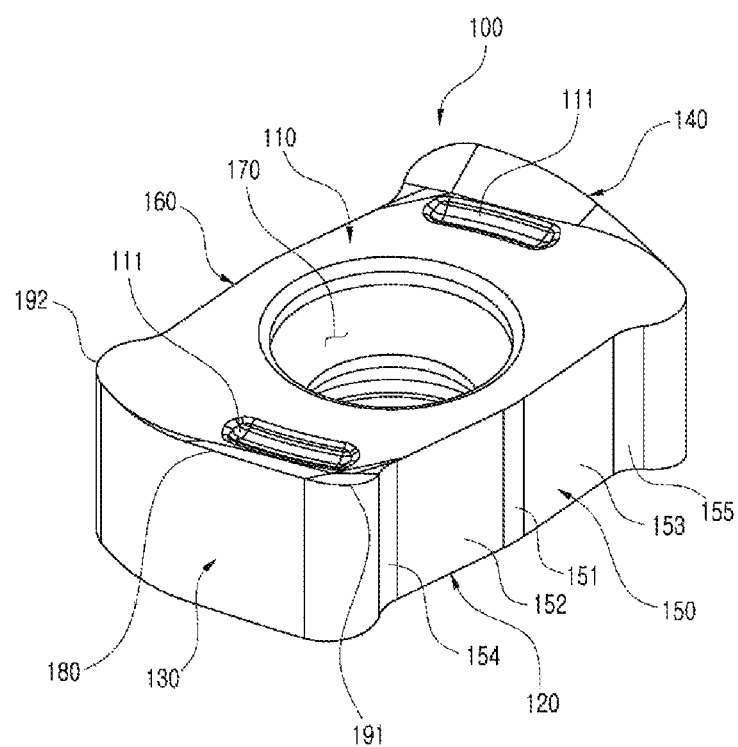
FIG. 1 is a perspective view schematically illustrating a cutting insert according to a first embodiment of the present disclosure.
Figure 2:
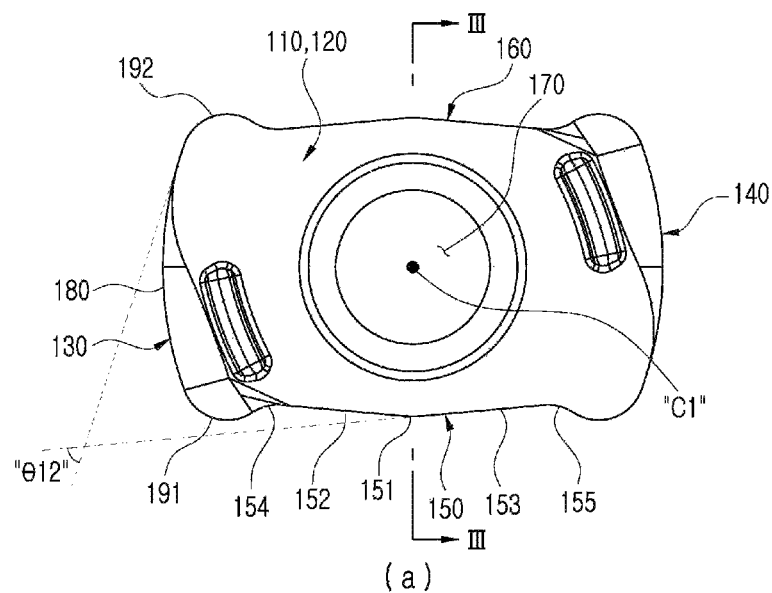
FIG. 2 is a view of the cutting insert of FIG. 1 when viewed toward an upper surface.
Figure 2:
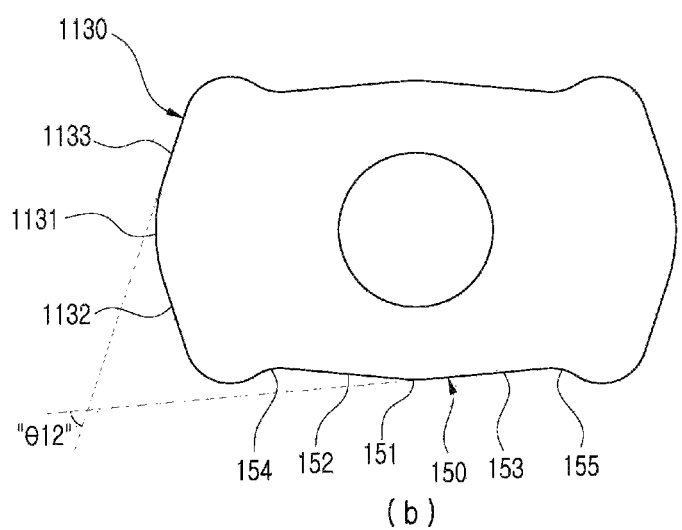
Figure 3:
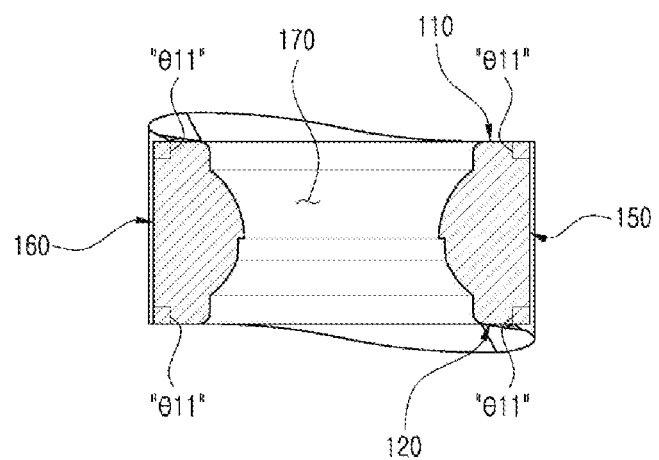
FIG. 3 is a view of the cutting insert of FIG. 2 taken along the line III-III.
Figure 4:
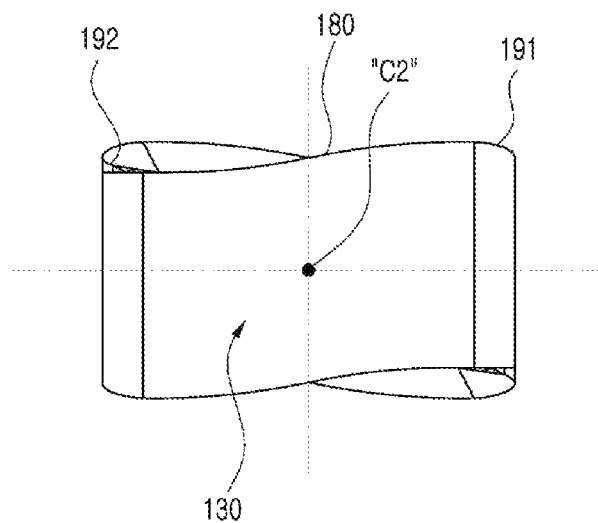
FIG. 4 is a view of the cutting insert of FIG. 1 when viewed toward a first shorter side surface.
Figure 5:
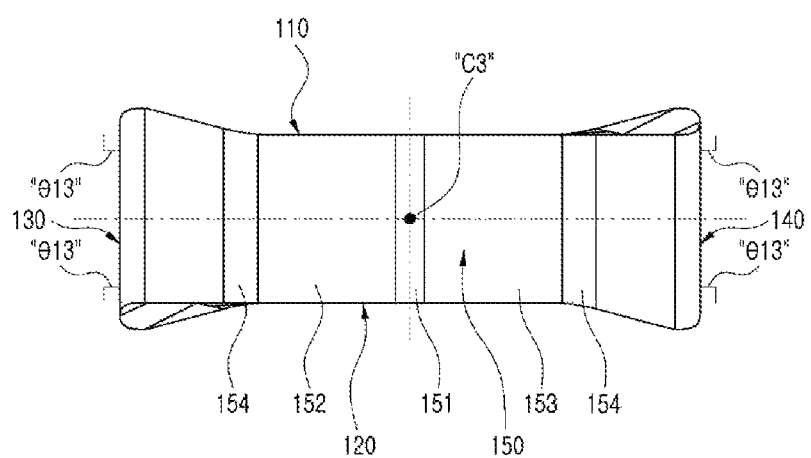
FIG. 5 is a view of the cutting insert of FIG. 1 when viewed toward a first longer side surface.

FIG. 1 is a perspective view schematically illustrating a cutting insert according to a first embodiment of the present disclosure, FIG. 2 is a view of the cutting insert of FIG. 1 when viewed toward an upper surface, FIG. 3 is a view of the cutting insert of FIG. 2 taken along the line FIG. 4 is a view of the cutting insert of FIG. 1 when viewed toward a first shorter side surface, and FIG. 5 is a view of the cutting insert of FIG. 1 when viewed toward a first longer side surface.

Figure 6:
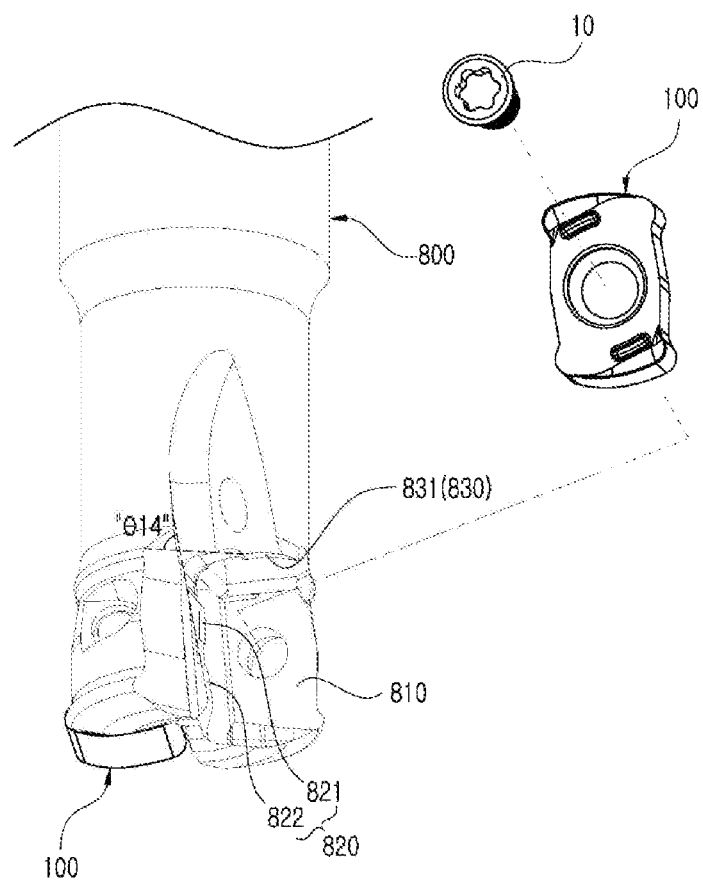
FIG. 6 is a perspective view schematically illustrating a cutting tool having the cutting insert of FIG. 1 mounted therein.

FIG. 6 is a perspective view schematically illustrating a cutting tool having the cutting insert of FIG. 1 mounted therein.

According to the first embodiment of the present disclosure, the cutting insert 100 includes an upper surface 110, a lower surface 120, first and second shorter side surfaces 130 and 140, first and second longer side surfaces 150 and 160, a through hole 170, a shorter cutting edge 180, a first corner cutting edge 191, and a second corner cutting edge 192, as shown in FIGS. 1 to 6. Hereinafter, each of the components will be described in detail with continued reference to FIGS. 1 to 6.

As shown in FIGS. 1, 2, 4, and 5, the upper surface 110 and the lower surface 120 may be oriented in opposite directions. The first and second shorter side surfaces 130 and 140 may connect the upper surface 110 and the lower surface 120 to each other and may be oriented in opposite directions, and the first and second longer side surfaces 150 and 160 may connect the upper and lower surfaces 110 and 120 to each other, connect the first and second shorter side surfaces 130 and 140 to each other, may be oriented in opposite directions, and may have a greater length than the first shorter side surface 130. As shown in FIGS. 1 and 3, the through hole 170 extends through the upper surface 110 and the lower surface 120 to receive a cutting tool fastening bolt (10 of FIG. 6) that may be inserted therein.

As shown in FIGS. 1, 2 and 4, the shorter cutting edge 180 is the part that cuts the workpiece and may be provided at a boundary between the upper surface 110 and the first shorter side surface 130. The first corner cutting edge 191 may be provided at a boundary between the upper surface 110 and a corner between the first longer side surface 150 and the first shorter side surface 130, and the second corner cutting edge 192 may be provided at a boundary between the upper surface 110 and a corner between the second longer side surface 160 and the first shorter side surface 130.

Hereinafter, the first longer side surface 150 will be described in detail with reference to FIGS. 1 to 3, 5 and 6.

As shown in FIG. 2, when viewed toward the upper surface 110, the first longer side surface 150 may have a shape such that both sides 152 and 153 are inclined with reference to a center portion 151 thereof. Thus, as shown in FIGS. 2 and 6, the inclined both sides (see 152 and 153) come into close contact with a first longer side inclined surface 821 and a second longer side inclined surface 822 of a second seat surface 820 of a cutting tool 800, which can improve the fastening force with the second seat surface 820 of the cutting tool 800 during cutting.

In addition, as shown in FIG. 2, when viewed toward the upper surface 110, the first longer side surface 150 may have a shape such that the center portion 151 thereof is convexly protruded. Accordingly, the through hole 170 and the cutting tool fastening bolt 10 inserted therein may be formed with a relatively large diameter, thereby further improving the fastening force with the cutting tool 800.

For example, as shown in FIG. 2, when viewed toward the upper surface 110, the first longer side surface 150 may include a convex portion 151, first and second inclined sections 152 and 153, and first and second concave portions 154 and 155. In this example, the convex portion 151 may protrude convexly to form a center portion of the first longer side surface 150, and the first and second inclined sections 152 and 153 may form both sides with reference to the convex portion 151 and may be gradually inclined toward the inside of the upper surface 110 as farther away from the convex portion 151. Further, the first and second concave portions 154 and 155 are concavely recessed and may form end portions of the first and second inclined sections 152 and 153, respectively. Thus, as shown in FIGS. 2 and 6, since the first and second inclined sections 152 and 153 come into close contact with the first longer side inclined surface 821 and the second longer side inclined surface 822 of the second seat surface 820 of the cutting tool 800, this can improve the fastening force with the second seat surface 820 of the cutting tool 800 during cutting, and since the portion of the upper surface 110 that corresponds to the first convex portion 151 forming the center portion of the first longer side surface 150 is increased in size, the through hole 170 and the cutting tool fastening bolt 10 inserted therein may be formed with a relatively large diameter, thereby further enhancing the fastening force with the cutting tool 800.

In addition, as shown in FIG. 3 cut along a vertical direction from the upper surface 110 to the lower surface 120, the first longer side surface 150 may form a vertical angle θ11 (so-called "negative type") with the upper surface 110. Accordingly, compared with when an acute angle (so-called, "positive") is formed therebetween, the rigidity of the boundary between the upper surface 110 and the first longer side surface 150 can be increased.

Hereinafter, the first shorter side surface 130 will be described in detail with reference to FIGS. 1, 2, and 4 to 6.

As shown in FIG. 2A, when viewed toward the upper surface 110, the first shorter side surface 130 may have an outwardly convex shape. In particular, as shown in FIG. 2A, one side of the first shorter side surface 130 with reference to the center portion thereof (the upper portion of the first shorter side surface 130 of FIG. 2) may form an acute angle θ12 with the second inclined section 153 corresponding to one side of the inclined shape of the first longer side surface 150. Thus, as shown in FIG. 6, wedge coupling may be formed between a shorter side inclined fastening surface 831 of the third seat surface 830 of the cutting tool 800 and the second longer side inclined fastening surface 822 of the second seat surface 820 (see 014), thereby further improving the fastening force with the cutting tool 800.

In one example, as shown in FIG. 2A, when viewed toward the upper surface 110, the first shorter side surface 130 may have a curved shape as a whole.

As another example, as shown in FIG. 2B, when viewed toward the upper surface 110, the first shorter side surface 1130 may have a combined shape that includes a curved section 1131 forming a center portion, and first and second straight sections 1132 and 1133 that form both sides with reference to the curved section 1131.

In addition, as shown in FIG. 5, when viewed toward the first longer side surface 150, the first shorter side surface 130 may form a vertical angle θ13 (so-called, "negative type") with the upper surface 110. Therefore, compared with when an acute angle (so-called, "positive") is formed therebetween, the rigidity of the shorter cutting edge 180 provided at the boundary between the upper surface 110 and the first shorter side surface 130 can be increased.

Hereinafter, the shorter cutting edge 180 will be described in detail with reference to FIGS. 1, 2, and 4.

As shown in FIG. 2A, when viewed toward the upper surface 110, the shorter cutting edge 180 may have a curved shape that is outwardly convex. Therefore, a convex curved shape may increase the edge strength for the shorter cutting edge 180 and reduce the contact resistance with the workpiece such that the cutting load may be reduced, which may ultimately allow the cutting insert 100 including the shorter cutting edge 180 having such a shape according to the present application to be a suitable insert for use in high feed machining. In addition, as shown in FIG. 2A, the center portion of the shorter cutting edge 180 may protrude most when viewed toward the upper surface 110.

Furthermore, as shown in FIG. 4, the shorter cutting edge 180 may form a curve when viewed toward the first shorter side surface 130. For example, as shown in FIG. 4, when viewed toward the first shorter side surface 130, the first corner cutting edge 191 may be positioned higher than the second corner cutting edge 192, and the highest portion of the shorter cutting edge 180 may be positioned closer to the first corner cutting edge 191 than the second corner cutting edge 192. Accordingly, since the shorter cutting edge 180 is curved when viewed toward the first shorter side surface 130 (see FIG. 4), and also has a curved shape that is outwardly convex (see FIG. 2A) or a shape that combines a curved line and a straight line (see FIG. 2B) when viewed toward the upper surface 110, the shorter cutting edge 180 has an approximately helix edge structure, which can improve the cutting characteristics for the shorter cutting edge 180 and reduce the cutting load on the shorter cutting edge 180.

Meanwhile, the technical characteristics of the cutting insert 100 according to the first embodiment of the present disclosure described above may be applied to both the single-sided cutting insert and the double-sided cutting insert.

When applied to the single-sided cutting insert, the upper surface 110 may have a structure that is rotationally symmetrical by 180 degrees with respect to the center C1 thereof, as shown in FIG. 2. Thus, as shown in FIG. 1, the cutting insert 100 according to the first embodiment of the present disclosure may alternately use, as a cutting edge, two corners placed in diagonal directions with respect to the cutting tool (see 800 in FIG. 6) rotated in either direction. Furthermore, a chip breaker (111 of FIG. 1) may be formed at portions corresponding to the two corners of the upper surface 110 such that the cut portion of the workpiece is curled and cut.

For application in the double-sided cutting insert, as shown in FIGS. 2, 4 and 5, it is necessary to have a structure such that the upper surface 110 and the lower surface 120 have the same shape, each of the upper surface 110 and the lower surface 120 is rotated by 180 degrees with respect to the center (C1 of FIG. 2) thereof, each of the first and second shorter side surfaces 130 and 140 is rotationally symmetrical by 180 degrees with respect to the center (C2 of FIG. 4) thereof, and each of the first and second longer sides 150 and 160 is rotationally symmetrical by 180 degrees with respect to the center (C3 in FIG. 5) thereof. Thus, as shown in FIGS. 1 and 2, the cutting insert 100 according to the first embodiment of the present disclosure may alternately use, as the cutting edge, the two corners placed diagonally on the upper surface 110 and the two corners placed diagonally on the lower surface 120, with respect to the cutting tool (see 800 in FIG. 6) rotated in either direction.

Hereinafter, a cutting tool 800 according to another embodiment of the present disclosure will be described in detail with reference to FIG. 6.

The cutting tool 800 according to another embodiment of the present disclosure is a cutting tool in which the cutting insert 100 according to the first embodiment of the present disclosure described above is mounted, and includes a first seat surface 810, a second seat surface 820, and a third seat surface 830 provided in a pocket portion thereof.

The first seat surface 810 is where the lower surface 120 of the cutting insert 100 described above is placed, the second seat surface 820 is where the first shorter side surface 130 of the cutting insert 100 described above is placed, and the third seat surface 830 is where the first longer side surface 150 of the cutting insert 100 described above is placed.

In particular, the second seat surface 820 may include the first longer side inclined fastening surface 821 and the second longer side inclined fastening surface 822 where the first and second inclined sections 152 and 153 corresponding to both inclined sides of the first longer side surface are respectively seated, and the third seat surface 830 may include the shorter side inclined fastening surface 831 on which one side of the first shorter side surface is seated, and which is adjacent the outer circumferential surface of the cutting tool, and the shorter side inclined fastening surface 831 may form an acute angle θ14 with the second longer side inclined fastening surface. Therefore, the cutting insert 100 described above may be wedge-coupled between the shorter side inclined fastening surface 831 and the second longer side inclined fastening surface of the cutting tool, and the fastening force is improved.

Hereinafter, a cutting insert 200 according to a second embodiment of the present disclosure will be described with reference to FIG. 7.

Figure 7A:
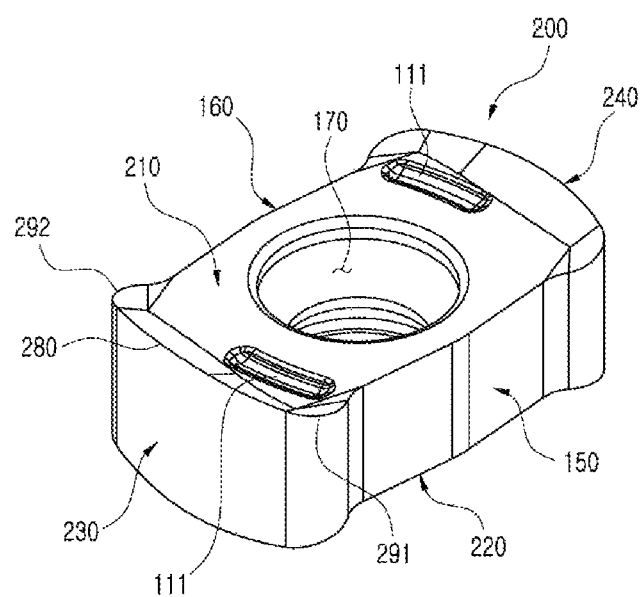
FIG. 7A is a perspective view of a cutting insert according to the second embodiment of the present disclosure.
Figure 7B:
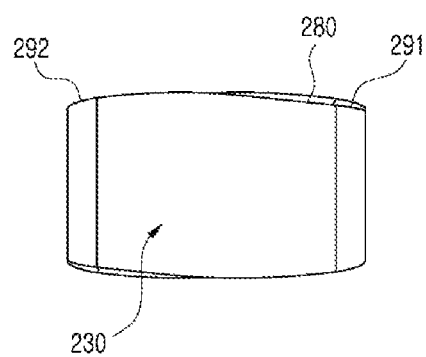
FIG. 7B is a schematic view when viewed toward the first shorter side surface thereof.

FIG. 7A is a perspective view of the cutting insert according to the second embodiment of the present disclosure, and FIG. 7B is a schematic view when viewed toward the first shorter side surface thereof.

As shown in FIG. 7, the cutting insert 200 according to the second embodiment of the present disclosure is the same as the first embodiment of the present disclosure described above except for a shorter cutting edge 280, first and second corner cutting edges 291 and 292, and the like, associated with the change in shape of first and second shorter side surfaces 230 and 240, which will be mainly described below.

As shown in FIG. 7B, when viewed toward the first shorter side surface 230, the first corner cutting edge 291 may be positioned lower than the second corner cutting edge 292, and the highest portion of the shorter cutting edge 280 may be positioned closer to the second corner cutting edge 292 than the first corner cutting edge 291.

Accordingly, since the shorter cutting edge 280 is curved in a shape that is outwardly convex when viewed toward the upper surface 210 (see FIGS. 2 and 7A), and also has a shape that combines a curved line and a straight line (see FIG. 7B) when viewed toward the first shorter side surface 230, the shorter cutting edge 280 has an approximately helix edge structure, which can improve the cutting characteristics for the shorter cutting edge 280 and reduce the cutting load on the shorter cutting edge 280.

Hereinafter, a cutting insert 300 according to a third embodiment of the present disclosure will be described with reference to FIG. 8.

Figure 8A:
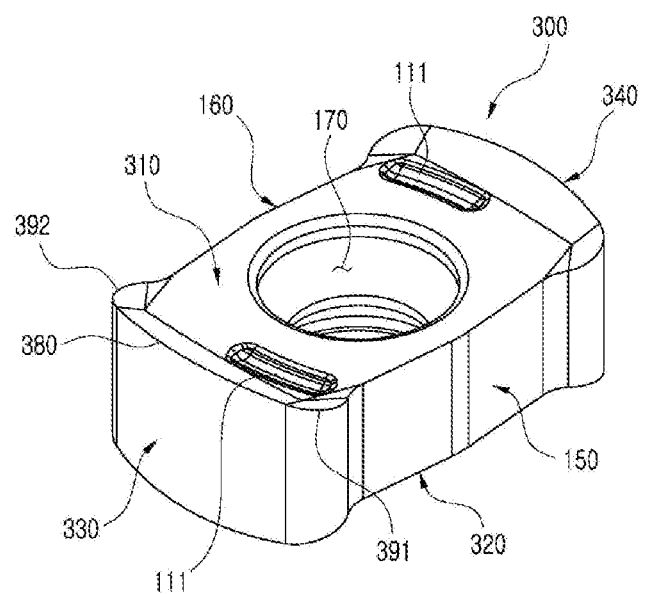
FIG. 8A is a perspective view of the cutting insert according to the third embodiment of the present disclosure.
Figure 8B:
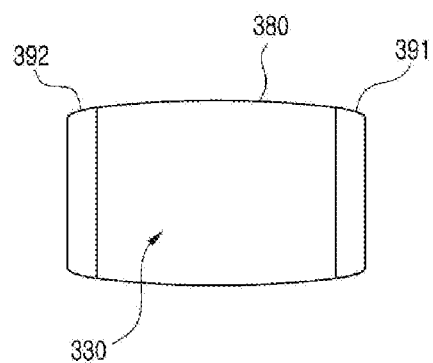
FIG. 8B is a schematic view when viewed toward the first shorter side surface thereof.

FIG. 8A is a perspective view of the cutting insert according to the second embodiment of the present disclosure, and FIG. 8B is a schematic view when viewed toward the first shorter side surface thereof.

As shown in FIG. 8, the cutting insert 300 according to the third embodiment of the present disclosure is the same as the first embodiment of the present disclosure described above except for a shorter cutting edge 380, first and second corner cutting edges 391 and 392, and the like, associated with the change in shape of first and second shorter side surfaces 330 and 340, which will be mainly described below.

As shown in FIG. 8B, when viewed toward the first shorter side surface 330, the first and second corner cutting edges 391 and 392 may be positioned at the same height, and the highest portion of the shorter cutting edge 380 may be positioned closer to the center than the first and second corner cutting edges 391 and 392.

Accordingly, since the shorter cutting edge 380 is curved in a shape that is outwardly convex when viewed toward the upper surface 310 (see FIGS. 2 and 8A), and also has a convex curve (see FIG. 8B) when viewed toward the first shorter side surface 330, the shorter cutting edge 380 has an approximately helix edge structure, which can improve the cutting characteristics for the shorter cutting edge 380 and reduce the cutting load on the shorter cutting edge 380.

Figure 13:
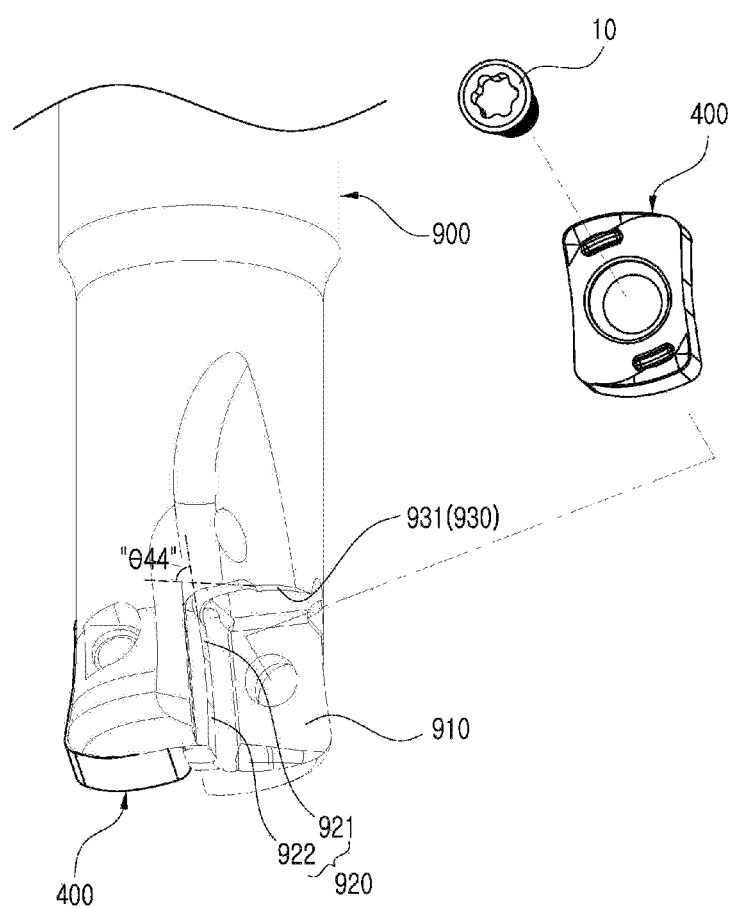
FIG. 13 is a perspective view schematically illustrating a cutting tool having the cutting insert of FIG. 9 mounted therein.
Figure 14:
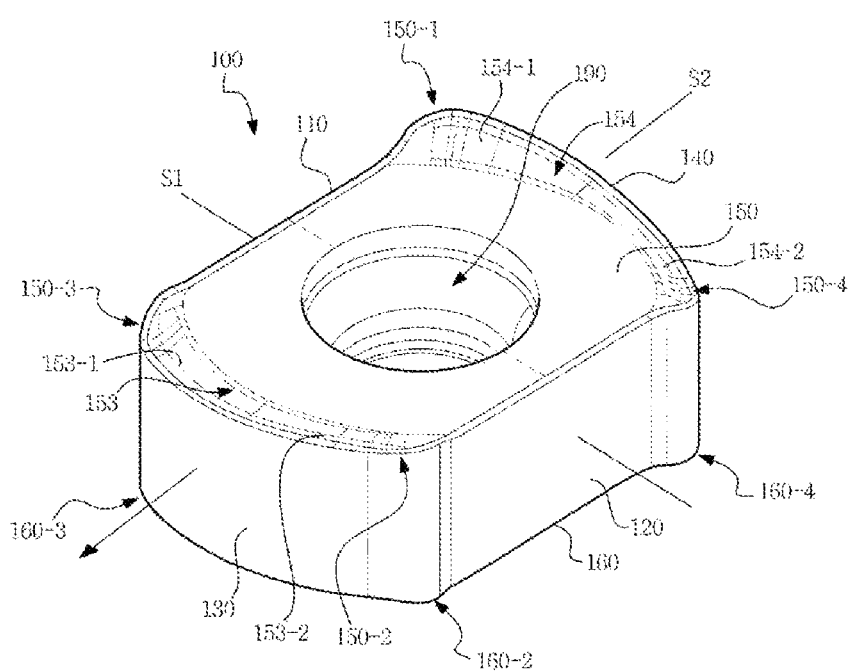
FIG. 14 is a perspective view schematically illustrating a related cutting insert.

Hereinafter, a cutting insert 400 according to a fourth embodiment of the present disclosure will be described with reference to FIGS. 9 and 13.

Figure 9:
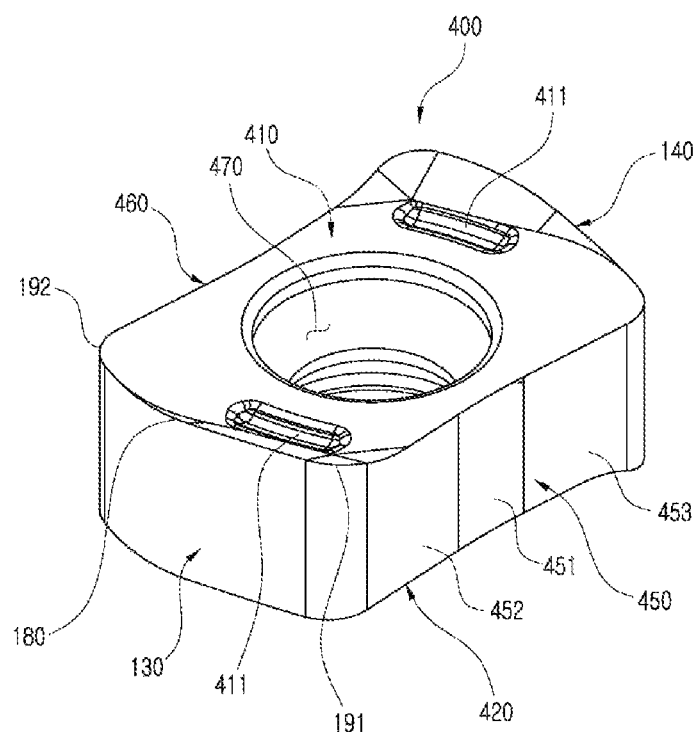
FIG. 9 is a perspective view schematically illustrating a cutting insert according to the fourth embodiment of the present disclosure.
Figure 10:
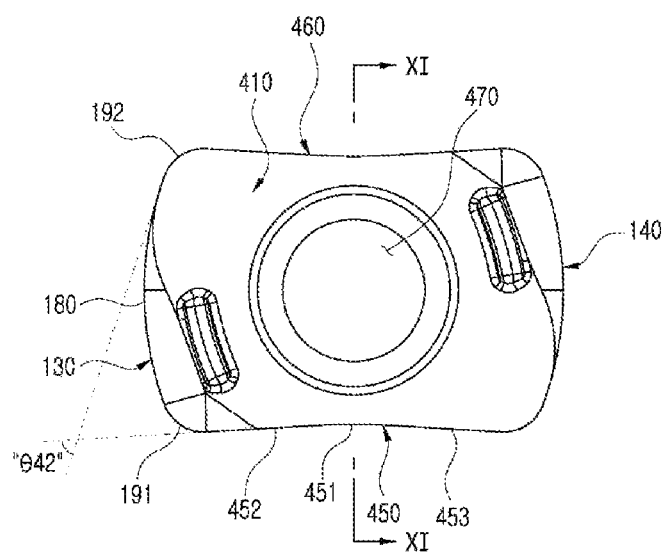
FIG. 10 is a view of the cutting insert of FIG. 9 when viewed toward the upper surface.
Figure 11:
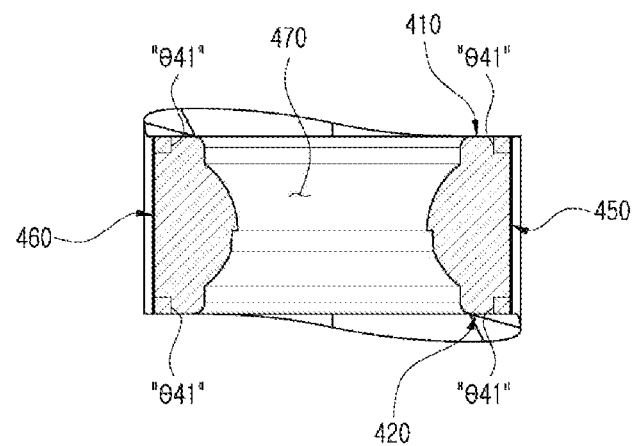
FIG. 11 is a view of the cutting insert of FIG. 10 taken along the line XI-XI.
Figure 12:
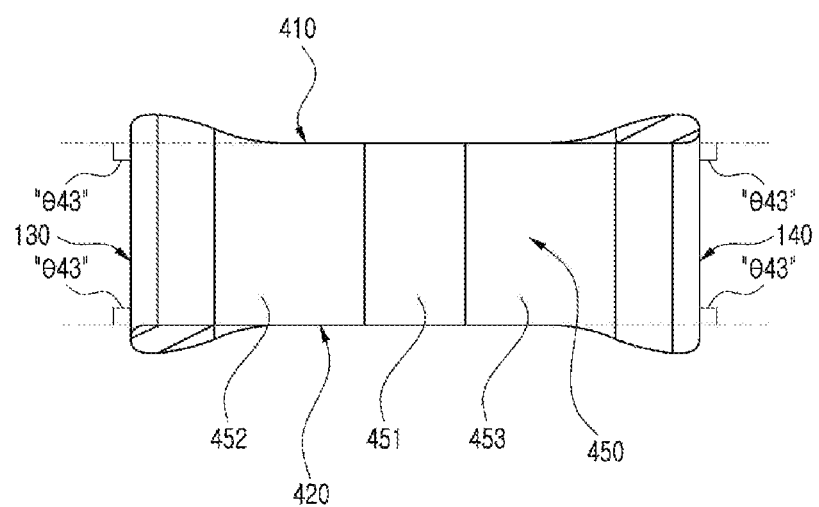
FIG. 12 is a view of the cutting insert of FIG. 9 when viewed toward the first longer side surface.

FIG. 9 is a perspective view schematically illustrating the cutting insert according to the fourth embodiment of the present disclosure, FIG. 10 is a view of the cutting insert of FIG. 9 when viewed toward the upper surface, FIG. 11 is a view of the cutting insert of FIG. 10 taken along the line XI-XI, and FIG. 12 is a view of the cutting insert of FIG. 9 when viewed toward the first longer side surface. FIG. 13 is a perspective view schematically illustrating a cutting tool having the cutting insert of FIG. 9 mounted therein.

As shown in FIGS. 9 to 13, the cutting insert 400 according to the fourth embodiment of the present disclosure is the same as the first embodiment of the present disclosure described above except for first and second longer side surfaces 450 and 460, the upper surface 410, the lower surface 420, and the like, which will be mainly described below.

As shown in FIG. 10, when viewed toward the upper surface 410, the first longer side surface 450 may have a shape such that both sides 452 and 453 are inclined with reference to a center portion 451 thereof. Thus, as shown in FIGS. 10 and 13, the inclined both sides (see 452 and 453) come into close contact with a first longer side inclined surface 921 and a second longer side inclined surface 922 of a second seat surface 920 of a cutting tool 900, which can improve the fastening force with the second seat surface 920 of the cutting tool 900 during cutting.

Furthermore, as shown in FIG. 10, when viewed toward the upper surface 410, the first longer side surface 450 may have a shape such that a center portion thereof is concavely recessed. Accordingly, as shown in FIG. 13, the second seat surface 920 of the cutting tool 900 may be protruded as much as the concave recess, that is, the web size of the cutting tool 900 may be increased, and this can further improve the holder rigidity of the cutting tool 900.

For example, as shown in FIG. 10, when viewed toward the upper surface 410, the first longer side surface 450 may include the concave portion 451 and the first and second inclined sections 452 and 453. Here, the concave portion 451 is concavely recessed and may form the center portion of the first longer side surface 450, and the first and second inclined sections 452 and 453 may form both sides with reference to the concave portion and may be gradually inclined as further away from the concave portion 451 outward the upper surface 410. Thus, as shown in FIGS. 10 and 13, the first and second inclined sections 452 and 453 come into close contact with the first longer side inclined surface 921 and the second longer side inclined surface 922 of the second seat surface 920 of the cutting tool 900, and this can improve the fastening force with the second seat surface 920 of the cutting tool 900 during cutting.

In addition, as shown in FIG. 11 cut along a vertical direction from the upper surface 410 to the lower surface 420, the first longer side surface 450 may form a vertical angle $\theta 41$ (so-called "negative type") with the upper surface 410. Accordingly, compared with when an acute angle (so-called, "positive") is formed therebetween, the rigidity of the boundary between the upper surface 410 and the first longer side surface 450 can be increased.

In particular, as shown in FIG. 10, one side of the first shorter side surface 130 with reference to the center portion thereof (the upper portion of the first shorter side surface 130 of FIG. 10) may form an acute angle $\theta 42$ with the first inclined section 452 corresponding to one side of the inclined shape of the first longer side surface 450. Thus, as shown in FIG. 13, wedge coupling may be formed between a shorter side inclined fastening surface 931 of the third seat surface 930 of the cutting tool 900 and the first longer side inclined fastening surface 921 of the second seat surface 920 (see 044), thereby still further improving the fastening force with the cutting tool 900.

Meanwhile, as shown in FIG. 12, when viewed toward the first longer side surface 450, the first shorter side surface 130 may form a vertical angle $\theta 43$ (so-called, "negative type") with the upper surface 410. Therefore, compared with when an acute angle (so-called, "positive") is formed therebetween, the rigidity of the shorter cutting edge 180 provided at the boundary between the upper surface 410 and the first shorter side surface 130 can be increased.

Hereinafter, the cutting tool 900 according to yet another embodiment of the present disclosure will be described in detail with reference to FIG. 13.

The cutting tool 900 according to yet another embodiment of the present disclosure is a cutting tool in which the cutting insert 400 according to the fourth embodiment of the present disclosure described above is mounted, and includes a first seat surface 910, a second seat surface 920, and a third seat surface 930 provided in a pocket portion thereof.

The first seat surface 910 is where the lower surface 420 of the cutting insert 400 described above is placed, the second seat surface 920 is where the first shorter side surface 130 of the cutting insert 400 described above is placed, and the third seat surface 930 is where the first longer side surface 450 of the cutting insert 400 described above is placed.

In particular, the second seat surface 920 may include the first longer side inclined fastening surface 921 and the second longer side inclined fastening surface 922 where the first and second inclined sections 452 and 453 corresponding to both inclined sides of the first longer side surface 450 are respectively seated, and the third seat surface 930 may include the shorter side inclined fastening surface 931 on which one side of the first shorter side surface 130 is seated, and which is adjacent the outer circumferential surface of the cutting tool 900, and the shorter side inclined fastening surface 931 may form an acute angle θ44 with the first longer side inclined fastening surface 921. Therefore, the cutting insert 400 described above may be wedge-coupled between the shorter side inclined fastening surface 931 and the first longer side inclined fastening surface 921 of the cutting tool 900, and the fastening force is improved.

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

INDUSTRIAL APPLICABILITY

A cutting insert according to the present disclosure is fastened to a cutting tool mounted in a machine tool and is used for cutting a workpiece made of iron, non-ferrous metal, non-metal material, and so on.

The invention claimed is:

1. A cutting insert which is mounted on a cutting tool by a fastening bolt, the cutting insert comprising:
   an upper surface and a lower surface oriented in opposite directions;
   a first shorter side surface and a second shorter side surface connecting the upper surface and the lower surface to each other and oriented in opposite directions;
   a first longer side surface and a second longer side surface connecting the upper surface and the lower surface to each other, connecting the first shorter side surface and the second shorter side surface to each other, oriented in opposite directions, and being longer than the first and the second shorter side surfaces;
   a through hole extending through the upper surface and the lower surface for receiving the fastening bolt that is inserted therein;
   a shorter cutting edge provided at a boundary between the upper surface and the first shorter side surface;
   a first corner cutting edge provided at a boundary between the upper surface and a corner connecting the first longer side surface and the first shorter side surface; and
   a second corner cutting edge provided at a boundary between the upper surface and a corner connecting the second longer side surface and the first shorter side surface, wherein,
   one of the upper and the lower surface is a rake surface, and the other is a fastening surface that contacts the cutting tool, when the cutting insert is mounted on the cutting tool, and
   one of the first and second longer side surfaces is a fastening surface contacting the cutting tool, when the cutting insert is mounted on the cutting tool, and
   wherein, when viewed toward the first shorter side surface, the shorter cutting edge includes a first section and a second section forming both sides with reference to a center thereof, the first section includes an upwardly curved portion and the second section includes a downwardly curved portion, and the upwardly curved portion and the downwardly curved portion collectively form a sideways S-shape,
   wherein, when viewed toward the upper surface,
   the first longer side surface has a shape such that both sides are inclined with reference to a center portion thereof,
   the first longer side surface comprises:
   a concave portion which is concavely recessed and which forms a center portion; and
   first and second inclined sections forming both sides with reference to the concave portion and being gradually inclined outward the upper surface as further away from the concave portion, and
   each of the first and second inclined sections has a straight shape,
   wherein the upper and lower surfaces have the same shape as each other, each of the upper and lower surfaces is rotationally symmetrical by 180 degrees with respect to a center thereof, each of the first and second shorter side surfaces is rotationally symmetrical by 180 degrees with respect to a center thereof, and each of the first and second longer side surfaces is rotationally symmetrical by 180 degrees with respect to a center thereof, and
   wherein, when viewed toward the upper surface, the first shorter side surface has an outwardly convex shape, and one side with reference to a center portion of the first shorter side surface forms an acute angle with one of the inclined sides of the first longer side surface.

2. The cutting insert according to claim 1, wherein, when viewed toward the upper surface,
   the first longer side surface has a shape such that the center portion thereof is convexly protruded.

3. The cutting insert according to claim 2, wherein, when viewed toward the upper surface,
   the first longer side surface comprises:
   a convex portion which is convexly protruded and which forms a center portion;
   first and second inclined sections forming both sides with reference to the convex portion and gradually inclined toward an inside of the upper surface as further away from the convex portion; and
   first and second concave portions which are concavely recessed and which form end portions of the first and second inclined sections.

4. The cutting insert according to claim 2, wherein, when viewed in a section cut along a vertical direction from the upper surface to the lower surface,
   the first longer side surface forms a vertical angle with the upper surface.

5. The cutting insert according to claim 1, wherein, when viewed toward the upper surface, the first shorter side surface has a curved shape as a whole or a shape that combines a curved line and a straight line.

6. The cutting insert according to claim 1, wherein, when viewed toward the first shorter side surface,
the shorter cutting edge has a curved shape as a whole or a shape that combines a curved line and a straight line.

7. The cutting insert according to claim 6, wherein, when viewed toward the first shorter side surface,
the first corner cutting edge is positioned higher than the second corner cutting edge, and
a highest portion of the shorter cutting edge is positioned closer to the first corner cutting edge than the second corner cutting edge.

8. The cutting insert according to claim 6, wherein, when viewed toward the first shorter side surface,
the first corner cutting edge is positioned lower than the second corner cutting edge, and
a highest portion of the shorter cutting edge is positioned closer to the second corner cutting edge than the first corner cutting edge.

9. The cutting insert according to claim 6, wherein, when viewed toward the first shorter side surface,
the first and second corner cutting edges are positioned at the same height, and
a highest portion of the shorter cutting edges is positioned closer to a center than the first and second corner cutting edges.

10. The cutting insert according to claim 6, wherein, when viewed toward the first longer side surface,
the first shorter side surface forms a vertical angle with the upper surface.

11. The cutting insert according to claim 10, wherein, when viewed toward the upper surface,
the shorter cutting edge has a curved shape that is outwardly convex.

12. The cutting insert according to claim 1, wherein, when viewed in a section cut along a vertical plane from the upper surface to the lower surface,
the first longer side surface forms a vertical angle with the upper surface.

13. A cutting tool having, mounted therein, the cutting insert according to claim 1, comprising:
a first seat surface on which the lower surface is placed;
a second seat surface on which the first longer side surface is placed; and
a third seat surface on which the first shorter side surface is placed,
wherein the second seat surface has a first longer side inclined surface and a second longer side inclined surface on which both sides of the first longer side surface are respectively seated.

14. The cutting insert according to claim 6, wherein, when viewed toward the first shorter side surface, the shorter cutting edge has the shape that combines the curved line and the straight line, the curved line is formed collectively by the upwardly curved portion and the downwardly curved portion, and the downwardly curved portion is disposed between the upwardly curved portion and the straight line.

* * * * *